(12) United States Patent
Jiang et al.

(10) Patent No.: US 10,074,363 B2
(45) Date of Patent: Sep. 11, 2018

(54) METHOD AND APPARATUS FOR KEYWORD SPEECH RECOGNITION

(71) Applicant: Apptek, Inc., McLean, VA (US)

(72) Inventors: Jintao Jiang, Great Falls, VA (US); Mudar Yaghi, McLean, VA (US)

(73) Assignee: Apptek, Inc., McLean, VA (US)

( * ) Notice: Subject to any disclaimer, the term of this patent is extended or adjusted under 35 U.S.C. 154(b) by 0 days.

(21) Appl. No.: 15/349,663

(22) Filed: Nov. 11, 2016

(65) Prior Publication Data

US 2017/0133038 A1 May 11, 2017

Related U.S. Application Data

(60) Provisional application No. 62/253,825, filed on Nov. 11, 2015.

(51) Int. Cl.
| | |
|---|---|
| *G10L 15/00* | (2013.01) |
| *G10L 15/187* | (2013.01) |
| *G10L 15/08* | (2006.01) |
| *G10L 15/16* | (2006.01) |

(52) U.S. Cl.
CPC ............ *G10L 15/187* (2013.01); *G10L 15/16* (2013.01); *G10L 2015/088* (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 5,390,278 A * | 2/1995 | Gupta | G10L 15/142 379/88.01 |
| 2004/0024599 A1* | 2/2004 | Deisher | G10L 15/142 704/256.3 |
| 2006/0074898 A1* | 4/2006 | Gavalda | G06F 17/30684 |
| 2008/0059170 A1* | 3/2008 | Bloebaum | G06F 17/30746 704/233 |
| 2016/0019882 A1* | 1/2016 | Matula | G10L 15/187 704/254 |
| 2016/0098999 A1* | 4/2016 | Jacob | G10L 19/00 704/201 |

* cited by examiner

*Primary Examiner* — Jesse Pullias
(74) *Attorney, Agent, or Firm* — Morgan, Lewis & Bockius LLP; Robert C. Bertin; Rachael Lea Leventhal (57) ABSTRACT

Phoneme images are created for keywords and audio files. The keyword images and audio file images are used to identify keywords within the audio file when the phoneme images match. Confidence scores may be determined corresponding to the match. Audio around the keywords may be stored and processed with an automatic speech recognition (ASR) program to verify the keyword match and provide textual and audio context to where the keyword appears within speech.

13 Claims, 5 Drawing Sheets

FIGURE 5 ized. Finally, like reference
METHOD AND APPARATUS FOR KEYWORD SPEECH RECOGNITION

FIELD OF THE INVENTION

The disclosed embodiments relate generally to speech recognition and, in particular, to speech recognition using deep neural networks.

BACKGROUND OF THE INVENTION

Automatic speech recognition engines are used for a variety of purposes. These engines tend to be complex and trained with particular contexts in mind. Many of these systems focus on transcribing all of the words in a stream of speech. This creates a large amount of data, some of which may not be relevant depending on the use to be made of the transcript. There may be some applications for which all of the text in a stream of speech are less relevant than keywords.

There is a need for a keyword based recognition system. There is a further need for methods and systems to train and deploy a speech recognition system based on keywords. There is a further need for a system that allows keyword recognition and speech data to be used to facilitate storing speech and/or text data near keywords to facilitate retrieval of keywords and speech data or text surrounding keywords.

SUMMARY OF THE INVENTION

Various embodiments of systems and methods within the scope of the appended claims each have several aspects, no single one of which is solely responsible for the attributes described herein. Without limiting the scope of the appended claims, after considering this disclosure, and particularly after considering the section entitled "Detailed Description," one will understand how the aspects of various embodiments are used to enable specific personalized nutrition systems and methods.

The disclosed systems and methods, according to some embodiments, create keyword based phoneme images and a phoneme image for an audio file and identify keywords within the audio file when the phoneme images match. According to some embodiments, a system for processing audio includes a memory and a processor. The memory stores program instructions for creating, smoothing, and de-noising a phoneme image map and for storing keyword phoneme images. The processor is coupled to the memory and executes program instructions to processes an audio file; to create, smooth, and de-noise a phoneme image map for the audio file; to create individual phoneme image maps for keywords; and to search the individual phoneme image maps for occurrences of keyword patterns.

According to some embodiments, the program instructions include logic that further applies constraints on the matched keywords and computes confidence scores. The memory may further store the audio or portions thereof and an automatic speech recognition (ASR) program. In some embodiments, the processor may execute the ASR program instructions to convert speech to text for a certain duration of audio on one or both sides of a keyword found within an audio stream.

BRIEF DESCRIPTION OF THE FIGURES

So that the present disclosure can be understood in greater detail, a more particular description may be had by reference to the features of various embodiments, some of which are illustrated in the appended drawings. The appended drawings, however, merely illustrate the more pertinent features of the present disclosure and are therefore not to be considered limiting, for the description may admit to other effective features.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Overview

This application claims the benefit of priority to earlier filed U.S. Provisional Patent Application No. 62/253,825 filed on Nov. 11, 2015.

An approach of keyword speech recognition is described. A deep neural networks based acoustic triphone model is trained. Frame based fuzzy phoneme identities are obtained (see FIG. 1). The top three triphones are produced and the triphone identifies are reduced to phonemes. Before searching, a frame-phoneme image (see FIG. 1) is processed using image-based approaches (smoothing and de-noising). For each keyword to be searched, the pronunciations are prepared. A keyword pronunciation pattern is searched across the frame-based fuzzy phoneme pattern (See FIG. 2). The search generally consists of three steps: (1) The first step is a general search that obtains all possible keyword candidates that include start and end points for each phoneme; (2) The second step is a refinement that uses frame based energy level, frame based energy derivative, frame based voicing, triphone connections (e.g., @{k+n} and n{x+s} can connect), phonemic duration (e.g., vowel is longer) to define a word boundary and to refine and verify the search; (3) The third step is to run a local automatic speech recognition (ASR) around found keywords to include the context information. For the first step of general search, an image based fingerprinting approach is used to make a faster and better performance. After the second step, the confidence score for each found keyword is also computed. The Keyword Speech Recognition is also packaged with a pronunciation dictionary and a grapheme-to-phoneme conversion tool. That is, user can upload new keywords and the system will automatically generate the corresponding pronunciations. Besides, the system can take user defined pronunciations for existing or new keywords. The description of the approach is divided into two parts: Offline model preparation and online processing.

Offline Model Preparation

One can use available tools to train a deep neural networks (DNN) triphone model according to some embodiments using Kaldi, RWTH ASR, or other Toolkits, which have standard components including, but not limited to, DNN, triphone, and linear discriminant analysis (LDA). To train a DNN triphone model, audio and corresponding transcription is needed. This type of data can be obtained from LDA or other channels. In addition, word pronunciations are used to build flexibility in some embodiments. One can use the Carnegie Mellon University (CMU) pronunciation dictionary for this purpose. For an out-of-vocabulary word, generally a grapheme-to-phoneme tool is used to predict the out-of-vocabulary word's pronunciation in some embodiments. To train a triphone model, linguistic groups are prepared in some embodiments. This can be obtained from standard linguistic text books with groupings such as voicing, labial, dental, plosive, etc.

In this example, an ASR Toolkit, for example one from RWTH, may be used along with audio data with associated transcriptions. Illustrative data may also include word pronunciations data, a RWTH grapheme-to-phoneme conversion tool, and a general linguistic question list. For example, there may be 4501 classes in associated with triphone modeling. The audio has 8 kHz sampling rate for this example and in some embodiments, but may be any rate. The acoustic features are standard Mel Frequency Cepstral Coefficients (MFCC) features, which have a frame size of 25 ms, a frame shift of 10 ms, and output size of 12 coefficients per frame in some embodiments. MFCC features are transformed with LDA with a window size of 9 frames and an output size of 45 in some embodiments. Fifteen consecutive LDA features are concatenated to form a 675 dimension vector per frame in some embodiments. The concatenated features in this example are first mean and variance normalized and then fed to the DNN for training.

The DNN model is trained first with supervised pre-training and then is followed by fine-tuning in some embodiments. The DNN has six hidden layers with 2048 nodes each. The output SoftMax layer has 4501 nodes. The training is performed on a CUDA-enabled GPU machine. DNN modeling generally produces better results than traditional Gaussian mixture modeling. Both Kaldi and RWTH toolkits provide recipes for supervised pre-training and fine-tuning. In pre-training, the first hidden layer is trained and fixed; then the second hidden layer is added, trained, and fixed; so on and so forth as layers are added. During fine-tuning, the DNN learning rate is controlled using a Newbob protocol. That is, after each iteration, the new DNN model is evaluated against a development data set on the frame classification error. The new learning rate depends on the improvement on the frame classification error; and the fine-tuning stops when the improvement is very small.

The DNN model training is the standard procedure in this example and in some embodiments. However, any procedure may be used to train the DNN.

Online Processing

To prepare for the online processing, the DNN activation output classes are reduced to phonemes in some embodiments. In one example, the 4501 DNN activation output classes are reduced to 43 phonemes (including silence). This table is called a triphone map. The original triphone lookup table is kept for later reference (e.g., a{k+n} ←→ ####). A phoneme duration table is created in some embodiments for limiting the phoneme duration. For example, long vowels are at least 5 frames (50 ms) long in some embodiments, while consonants are 2 frames (20 ms) long. The words in a keyword list to be searched are provided with pronunciations in some embodiments by, for example, dictionary lookup or through grapheme-to-phoneme prediction as described above. Multiple pronunciations for one word are allowed in some embodiments. One example is as follows:

Negative Pronunciations:
    Phoneme set 1: n E g t I v
    Phoneme set 2: n E g t x v
    Phoneme set 3: n E g x t I v
    Phoneme set 4: n E g x t x v The word negative could have four candidate pronunciations as shown above.

Below is an illustrative workflow of the online keyword speech recognition:

```
Initialization
    Loading the DNN model
    Loading the triphone map
    Loading the phoneme duration table
    Load the triphone lookup table
    Loading the keyword pronunciation table
Loop-Feature-Frame
    Feature extraction (MFCC and LDA)
    DNN evaluation of the feature
    The 4501 SoftMax layer output of the DNN is sorted based on activation
    Top three activations' corresponding phonemes are marked based on the triphone map
    Each frame is also processed to obtain the following features (see Figure 3):
        L2-norm energy
        Voicing feature
        L2-energy slope (estimated from 11 frames)
    A image is obtained with time (frame) by phoneme (see Figure 1)
    Image smoothing and de-noising along the phoneme dimension:
        Smoothing in time (frame) for each phoneme: connecting fragments with small gaps
        De-noising in time (frame) for each phoneme: removing isolated small fragments
    Segmenting in time (frame) for each phoneme
        Finding consecutive frames and log the starting and end points
        Merging those neighboring segments that have small gaps
[Keyword Speech Recognition]
Loop-Keyword
    Obtain the word
    Obtain the pronunciations
    Loop-Keyword-Pronunciations
```

```
        Obtain the pronunciation (phonemes)
        Obtain a sub-image for this pronunciation (see Figure 2)
        Loop-Last-Phoneme-Segments
            Pattern matching (image finger printing pattern)
            If matched
                Apply general duration constraint: Average frames/phone >= 6
                Apply individual phoneme duration constraints
                Apply voicing constraints (voicing vs. voiceless)
                Apply L2-norm energy and energy slope constraints
                    Word boundary: low energy and low slope
                Apply triphone connection constraints based on the lookup
                Add confidence score based on ambiguity during the matching
                If constraints pass
                    Keyword found and save the timing information
    For each keyword, merge similar/overlapping segments
    Across all keyword segments, remove part-of-word keywords
        If "can" is inside "can't", then "can" is removed
    Sorting all found keyword based on the starting frame
    Output keywords in xml format
        <?xml version="1.0" encoding="UTF-8"?>
        <sprint>
        <corpus name="XXX">
         <recording name="XXX">
          <item start="1.50588" end="1.92088">late</item>
          ...
          <item start="3.33587" end="3.93087">return</item>
          ...
         </recording>
        </corpus>
        </sprint>
    Based on the keyword output timestamps, short segments of high interest are sent to regular ASR
```

Confidence Score Computation

Assume that the matched keyword starts at t1 and ends at t2. The sorted scores are $s_{t,i}$, for which t is the time (frame) and i is the index of sorted scores (from highest activations to lowest). The total score is computed as:

$$S_{total} = \Sigma_{t=t1}^{t2} \Sigma_{i=1}^{3} s_{t,i}$$

Figure 2:
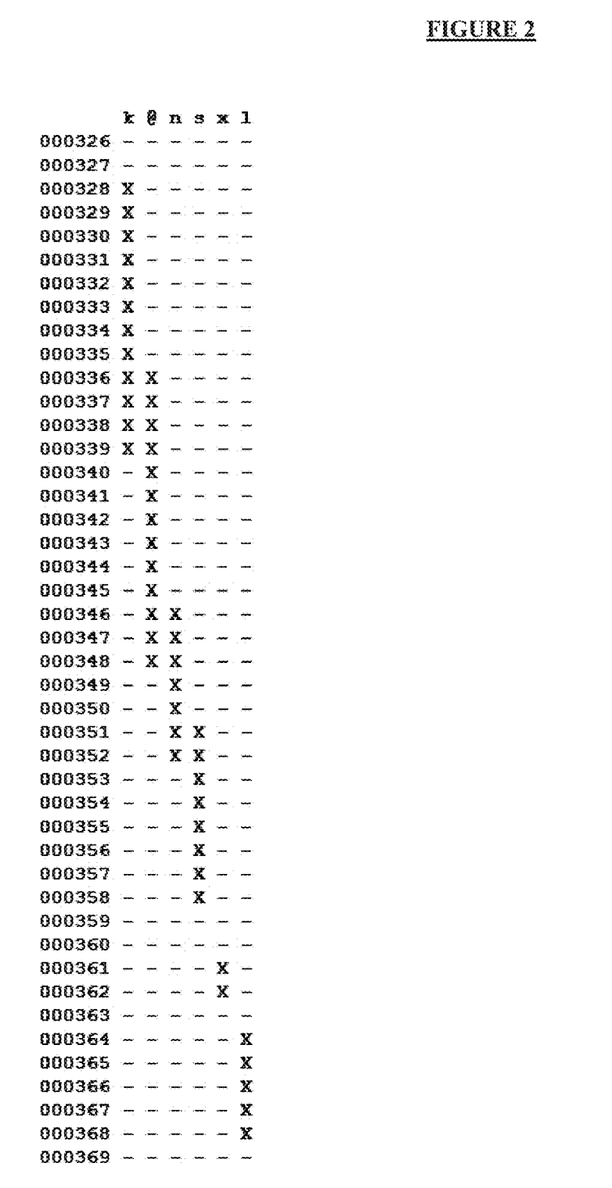
FIG. 2 is an illustrative phoneme based image map of one pronunciation of the word "cancel" according to some embodiments.

To compute the matched score, pattern matching paths are first defined as $m_{t,i}$ (see FIG. 2). If at time t there is a phoneme match, then $m_{t,i}$ is 1, otherwise 0. At one time frame, there can be two matched phonemes (see the overlap in FIG. 2).

$$S_{matched} = \Sigma_{t=t1}^{t2} \Sigma_{i=1}^{3} m_{t,i} \cdot s_{t,i}$$

The confidence score is computed as $$\frac{S_{matched}}{S_{total}}.$$

One example of a minimal phoneme duration table is shown below:

Minimal Phoneme Duration

| | |
|---|---|
| @ | 3 |
| a | 5 |
| A | 3 |
| b | 2 |
| c | 3 |
| C | 3 |
| d | 2 |
| D | 3 |
| e | 5 |
| E | 4 |
| f | 2 |
| g | 2 |
| G | 2 |
| h | 2 |
| H | 3 |
| i | 5 |
| I | 2 |
| J | 3 |
| k | 2 |
| l | 2 |
| m | 2 |
| n | 2 |
| N | 2 |
| o | 5 |
| O | 5 |
| p | 2 |
| r | 2 |
| R | 3 |
| s | 2 |
| S | 3 |
| si | 3 |
| t | 2 |
| T | 3 |
| u | 5 |
| U | 3 |
| v | 2 |
| w | 2 |
| W | 5 |
| x | 2 |
| y | 3 |
| Y | 5 |
| z | 2 |
| Z | 3 |

Pronunciation Modeling

When keyword speech recognition is deployed at a user's site, a tool will be provided to help a user to upload a keyword list to be searched against audio data. Once the keywords are known, in some embodiments, pronunciations are generated automatically. Towards this end, a pronunciation dictionary and a grapheme-to-phoneme conversion tool may be used. When the keyword is within the dictionary, the pronunciation may be automatically retrieved. When the keyword is outside the dictionary, the grapheme-to-phoneme conversion tool may be used to generate variations in pronunciation. Furthermore, the tool may also provide a user the capacity to define customized pronunciations. This is especially helpful to deal with certain dialects.

Figure 1:
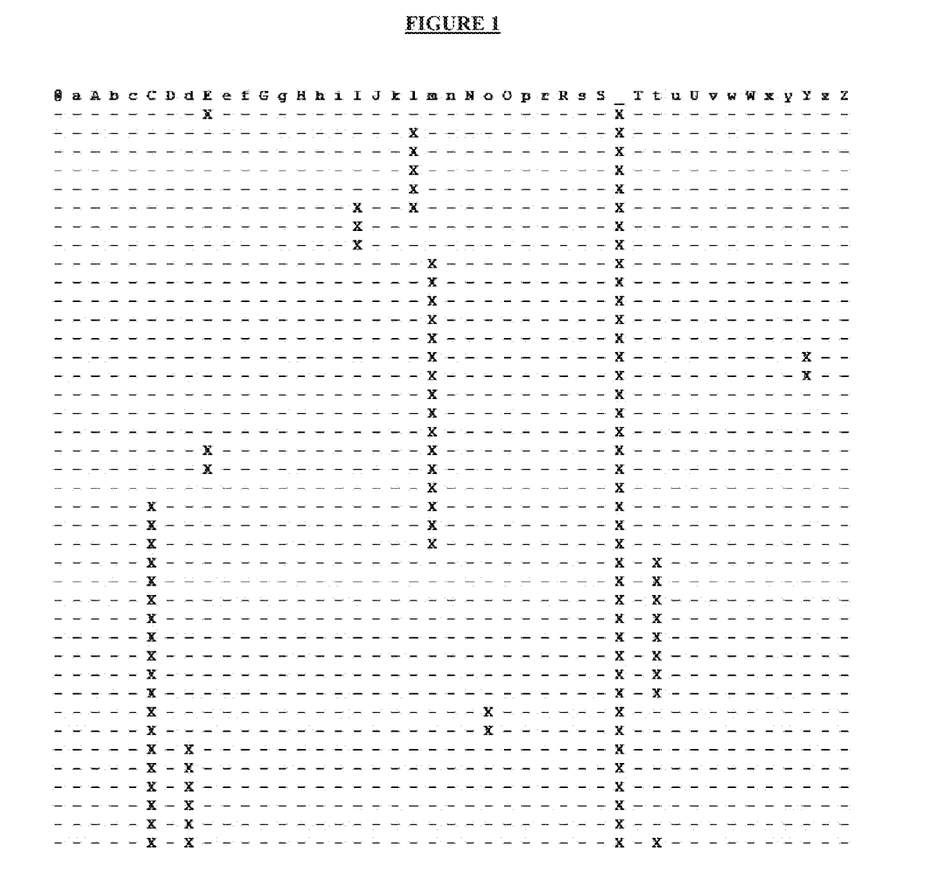
FIG. 1 is an illustrative phoneme based image map of an audio file that may be generated according to some embodiments.

FIG. 1 depicts an illustrative image of a map that corresponds to an audio file that may be generated according to one illustrative embodiment of the invention. Referring to FIG. 1, the horizontal axis is represented by phonemes and the vertical axis represents frames of time at a chosen interval, for example, 10 ms in some embodiments. Referring to FIG. 1, an audio file may be converted into an image of the type shown where the top of the image represents the start of the audio file and the bottom of the image represents the end of the audio file. Where the image depicts an "X" that refers to the presence of a phoneme identified by the column where "X" appears at an audio frame corresponding to the row where the "X" appears. Where nothing or a "–" appears, that refers to the lack of presence of the corresponding phoneme in the corresponding frame. The overall image is a map of a stream of audio that presents phonemes detected or likely to be present in each audio frame.

FIG. 2 represents an illustrative image of a map of one pronunciation of the word "cancel." There may be other maps for other pronunciations or accents or other desired features of the word. Referring to FIG. 2, the phonemes for the word "cancel" are arranged in the order of appearance in the word. Accordingly, the image shows a progression of the presence of the phonemes from left to right and top to bottom as the word is spoken and the audio progresses in frames from the start of the audio at the top to the end of the audio from "cancel" at the bottom.
It is apparent from this image that there is a progression from phoneme to phoneme until the word is completely spoken. It is also apparent that there is a small period of silence or reduced energy level of the sound after the "n" phoneme, which reflects the end of the first syllable of the word.
Here "cancel" may be a keyword that a user would like to search for within a stream of audio. The illustrative image for "cancel" provides a signature progression of phonemes and silence that may be used to compare with images of audio such as that shown in FIG. 1. When a match is determined between a signature image for "cancel" and a portion of an audio image of a file being reviewed (including the portion of the audio image corresponding to the phonemes present in the signature image) that is above a certain confidence threshold or likelihood, then a key word match has been found. The confidence scoring technique described above is one technique that may be implemented for this determination in some embodiments.

Figure 3:
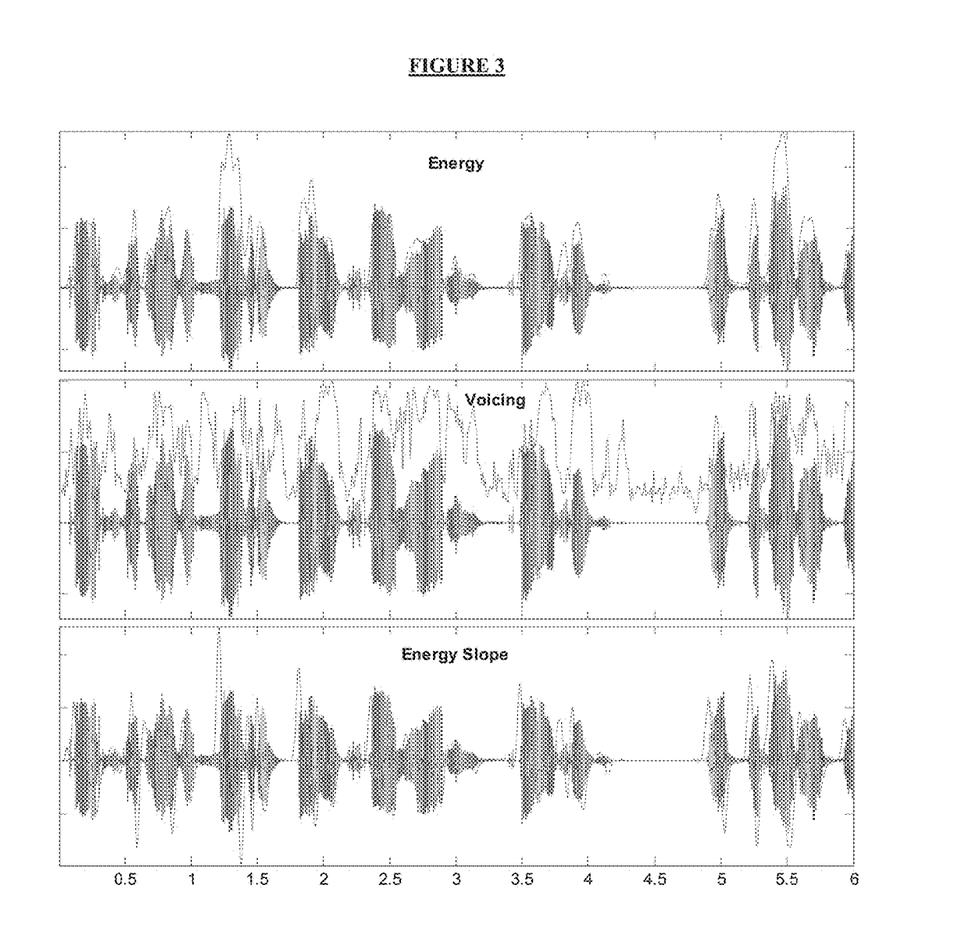
FIG. 3 depicts illustrative graphs of audio signal processing data obtained from an audio stream that are used according to some embodiments.

FIG. 3 depicts illustrative graphs of audio signal processing data that may be obtained from an audio stream as a part of processing an audio stream or file. Referring to FIG. 3, the audio is mapped over time in terms of amplitude and energy, and it may be processed to show L2-norm energy, a voicing feature and L2-energy slope. In the illustration of FIG. 3, the L2-energy slope is estimated from 11 frames.

Figure 4:
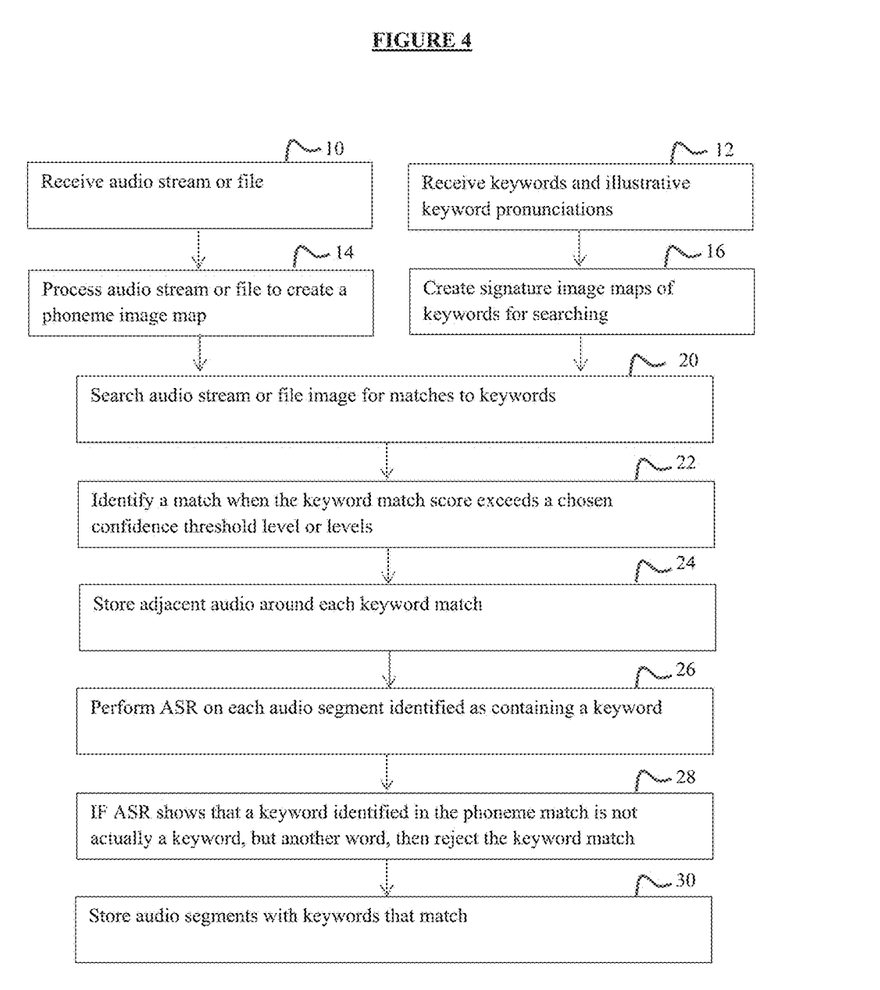
FIG. 4 depicts a method of recognizing keywords in an audio stream according to some embodiments.

FIG. 4 depicts an illustrative method according to one embodiment of the invention. Referring to FIG. 4, an audio file or stream is received in 10, for example from a telephone caller, a live stream of broadcast video or audio, from archived audio or video or from any other source of audio. Then the audio is processed in 14 by sampling and processing the speech signal as described herein to create an image map of the file showing the presence of phonemes in each frame of audio. The phonemes and audio may correspond to particular language and chosen time intervals. According to one embodiment described here, the frames are 10 ms long and the phonemes are 43 illustratively shown and described here.

Referring to FIG. 4, a system or a user specifies keywords in that are of interest to search for in a body of audio or audio streams or files. For example, a telemarketing firm may desire to search for words like "cancel" or other words which reflect frustration on the part of a caller. Each such word may be identified as a keyword in this step 12 and received by a system or method. In a subsequent step shown, each keyword is then converted in 16 for one or more pronunciations into a signature image map for that keyword.

Subsequently, as shown, according to the illustrative method the image map of an audio file or stream is searched and compared in 20 to each keyword to determine whether there is a match in 22 above a confidence level or score as identified above. The confidence level or score may be adjusted to be as over inclusive or under inclusive as desired. However, typically, over inclusive is better. Subsequently, a hybrid form of verification is done on each keyword match. Audio is stored adjacent to each keyword match in 24. The amount of audio desired is up to individual preference but for example, thirty seconds of audio may be stored with fifteen seconds prior to the matched word and fifteen seconds after the identified word.

Subsequently, automatic speech recognition (ASR) using any known tool or technique may be used in 26 to determine the words within the captured speech segment around each identified keyword. If the ASR in 28 does not identify the keyword as within the segment, then the keyword match is rejected. If the ASR does identify the keyword as within the segment then the audio segment is stored in 30. In this manner the image maps may be used to identify phoneme based keyword matches which are in turn verified by ASR, with surrounding audio stored. This hybrid verification technique increases the likelihood of false positives in keyword matching.

Additionally, this method makes available segments of audio that are stored that may be reviewed to determine how the keywords were used in the audio in the context of surrounding words. For example, management within a telemarketing firm may review text corresponding to the captured audio segments for keywords of interest such as "cancel" or other words that reflect frustration of callers or other desired categories of information. Such a person may desire to review not only the presence or frequency of the appearance of keywords within a single audio file or across audio files, but may want to see how the key word is appearing in context for each audio segment across multiple files. This may allow management to suggest changes to call agents scripts or techniques or otherwise allow better management. Any other application may advantageously make use of the presence of keywords in context in text segments output from audio files or the audio corresponding to the segments.

Figure 5:
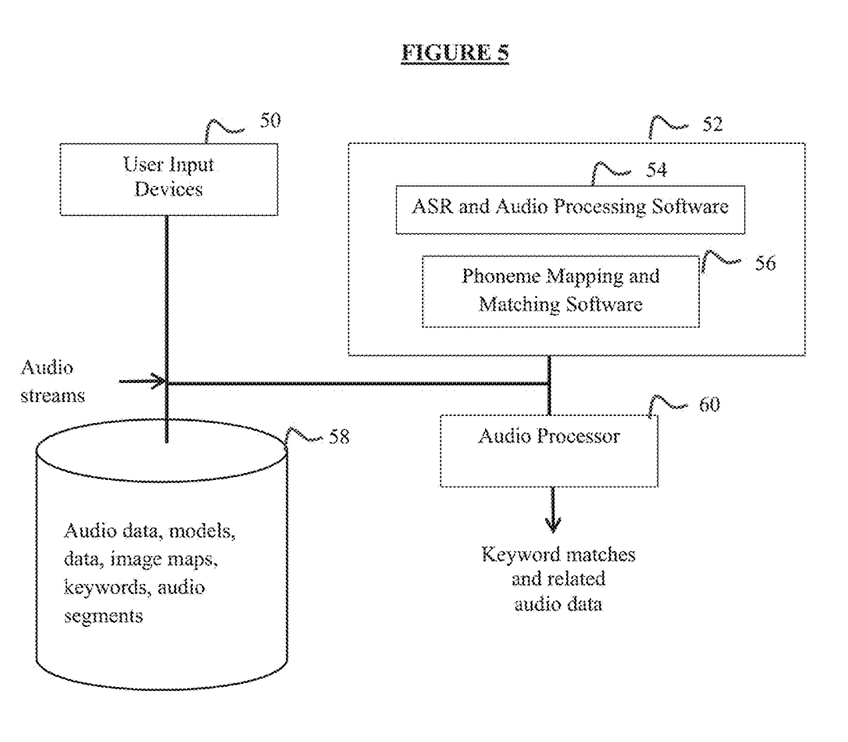
FIG. 5 depicts a system for processing audio files or streams according to some embodiments.

FIG. 5 depicts an audio system for processing audio files or streams according to an embodiment of the present invention. Referring to FIG. 5, the system includes user input devices 50, a memory 52, an audio processor 60, a database 58 that are coupled to each other. Additionally, each of these system components has the ability to receive audio streams from the database, a network or other sources. Referring to FIG. 5, the audio processor is coupled to a database, a memory and user input devices, which may be performed by a bus interface or network connections. The memory includes programs used to create and match the image maps of phonemes between keywords and the audio files which are to be analyzed for keyword matches. The memory also may include ASR software 54 for performing speech recognition of audio and generating text as well as other programs or tools described here, including phoneme mapping and matching software 56.

The user input and output devices may be any typical devices including keyboards, computer mice, touch screen input, microphones, video cameras, displays, speakers or other devices for communicating between a user and an audio processing system. The database stores audio files and data associated with audio processing as shown.

In operation the memory stores program instructions and data, and receives audio streams from a network or the database. The processor is coupled to the memory and executes the program instructions to process the data to create image maps of the phonemes as described and also implements the method shown in FIG. 4. The method includes receiving user input or files reflecting keywords to be matched. The processor executes the program instructions to identify keywords within audio streams, determine matches, identify segments of audio around the matches, running ASR on the audio segments and rejecting any identified matches that are not verified by the ASR. The processor also stores data identifying the matches, the ASR text corresponding to the segments with matches and optionally also the audio corresponding to the segments with the matches in the database. The information in the database may be made available to the users by the processor executing programs instructions for tools to display or otherwise transmit text corresponding to matches to users or to provide text and audio files to users for matched segments.

The program instructions may also be stored on media for execution by an audio processing system to perform the method describe herein.

While particular embodiments have been shown and described herein, it will be understood to those having ordinary skill in the art that changes may be made to those embodiments without departing from the spirit and scope of the invention.

What is claimed is:

1. A system for processing audio, comprising:
   a memory, including program instructions for creating, smoothing, and de-noising a phoneme image map and for storing keyword phoneme images; and
   a processor coupled to the memory for executing the program instructions,
   wherein the processor processes an audio file to create, smooth, and de-noise a phoneme image map for the audio file, create individual phoneme image maps for keywords, and search the individual phoneme image maps for occurrences of keyword patterns,
   wherein the memory further includes a program for further applying constraints on the matched keywords, and computing confidence scores, and
   wherein the processor further applies constraints on the matched keywords based on energy, voicing, energy slope, phoneme duration, and triphone connections, and computes confidence scores for those matched keywords that pass the constraint test.

2. The system of claim 1, wherein:
   the memory further includes a program for automatic speech recognition (ASR); and
   the processor further stores in the memory audio segments around each matched keyword in the audio stream, executes program instructions for the ASR on the segments, and determines whether the corresponding keyword appears in the ASR text output for each segment.

3. The system of claim 2, wherein the processor further stores in a database data corresponding to keyword matches, audio segment text for segments including a matching keyword, and audio data corresponding to the segment.

4. A method for keyword identification within an audio stream, the method comprising:
   receiving an audio stream;
   receiving at least one keyword;
   processing the audio stream to create an audio stream phoneme map;
   processing the at least one keyword to create at least one keyword phoneme map for each of the at least one keyword;
   searching the audio stream phoneme map for the at least one keyword phoneme map;
   identifying a match for each of the at least one keyword when the searching indicates at least one corresponding keyword phoneme map is found within the audio stream phoneme map with a confidence score that exceeds a predetermined level; and
   determining multiple phoneme maps corresponding to at least one of the keywords based on pronunciation information found in a dictionary.

5. The method of claim 4, further comprising storing a predetermined duration of the audio stream on either side of each matched keyword as an audio segment, including the portion of the audio stream corresponding to the keyword.

6. The method of claim 5, further comprising performing ASR on each audio segment identified as containing a keyword to determine text corresponding to each audio segment.

7. The method of claim 6, further comprising rejecting the keyword match for a corresponding audio segment if the ASR does not identify the keyword within the audio segment.

8. The method of claim 7, further comprising storing at least one audio segment, the text corresponding to the at least one audio segment, and the keyword associated with each of the at least one audio segment.

9. The method of claim 7, further comprising determining multiple phoneme maps corresponding to at least one of the keywords based on a grapheme to phoneme conversion tool.

10. The method of claim 4, wherein the determining includes de-noising.

11. The method of claim 4, wherein the determining includes smoothing.

12. The method of claim 4, wherein:
   the processor applies constraints to the determination of the matching score; and
   the score is determined based on the constraints.

13. A method for keyword identification within an audio stream, the method comprising:
   receiving an audio stream;
   receiving at least one keyword;
   processing the audio stream to create an audio stream phoneme map;
   processing the at least one keyword to create at least one keyword phoneme map for each of the at least one keyword;
   searching the audio stream phoneme map for the at least one keyword phoneme map;
   identifying a match for each of the at least one keyword when the searching indicates at least one corresponding keyword phoneme map is found within the audio stream phoneme map with a confidence score that exceeds a predetermined level; and training a deep neural network to create phoneme maps for audio streams.

\* \* \* \* \*